United States Patent [19]

Spofford et al.

[11] Patent Number: 4,675,961

[45] Date of Patent: Jun. 30, 1987

[54] REPLACEMENT OF SPLIT-PIN ASSEMBLIES IN GUIDE TUBES

[75] Inventors: Bruce S. Spofford, Plum Borough; Lorraine Fucich, Monroeville; David A. Howell, Plum Borough; John D. Nee, Level Green, all of Pa.; Richard A. Green, Farmington Hills, Mich.

[73] Assignee: Westinghouse Electric Corp., Pittsburgh, Pa.

[21] Appl. No.: 617,852

[22] Filed: Jun. 6, 1984

[51] Int. Cl.⁴ ..................... B23P 23/00; G21C 19/00
[52] U.S. Cl. ............................... 29/33 K; 29/400 N;
29/402.08; 29/402.17; 29/426.4; 29/434;
29/723; 376/260
[58] Field of Search ................. 29/33 K, 566, 400 N,
29/402.08, 402.17, 426.3, 426.4, 434, 723, 443;
376/353, 260, 463

[56] References Cited

U.S. PATENT DOCUMENTS

| | | | |
|---|---|---|---|
| 3,177,121 | 4/1965 | Horowitz et al. | 376/260 |
| 4,199,857 | 4/1980 | Meuschke et al. | 29/400 N |
| 4,292,133 | 9/1981 | Sasaki et al. | 376/260 |
| 4,477,957 | 10/1984 | Inman | 29/402.08 |
| 4,585,613 | 4/1986 | Styskal | 376/260 |

FOREIGN PATENT DOCUMENTS 2531563  4/1982  France .................. 376/353

OTHER PUBLICATIONS

"Dealing with Control Guide Tube Support Pin Cracking in French PWR's", by Laurent Guicherd, Nuclear Engineering International, Nov. 1984, pp. 29-33.
"Rapid Replacement for Slurry Guide Tube Support Pins", Nuclear Engineering International, Jun. 1985, p. 19.

Primary Examiner—Gil Weidenfeld
Assistant Examiner—Daniel W. Howell
Attorney, Agent, or Firm—H. Diamond

[57] ABSTRACT

The old split-pin assemblies of the lower guide tube of a nuclear reactor are replaced by new split-pin assemblies in a robotic work station under a pool of water. The work station includes a plurality of robotic tools which are remotely actuable from a robotic command center outside of the pool to position the guide tube precisely for a replacement operation, to fragment the old split-pin assemblies and dispose of the fragments under water, and to install a new split-pin assembly. The lower-guide-tube positioning means has a hydraulic cylinder, also remotely actuable externally to the pool, for rotating the guide tube so that it may be oriented properly to be processed by different tools in succession and also so that both split-pin assemblies in each guide tube may be replaced by the same set of tools.

6 Claims, 11 Drawing Figures

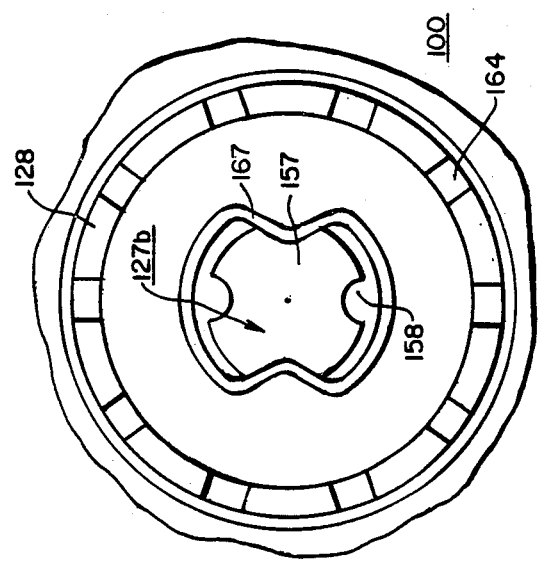
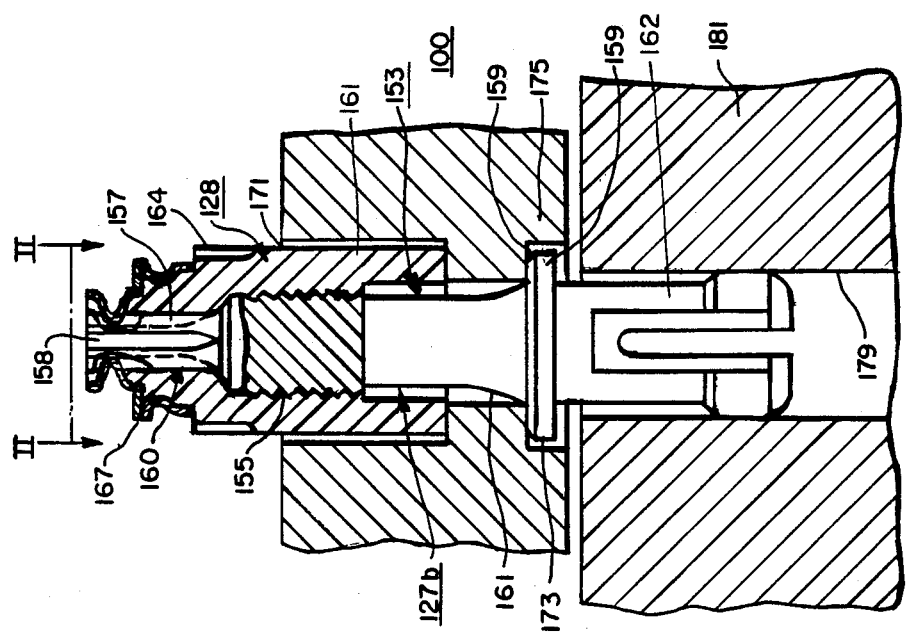
FIG. 2.
FIG. 1.

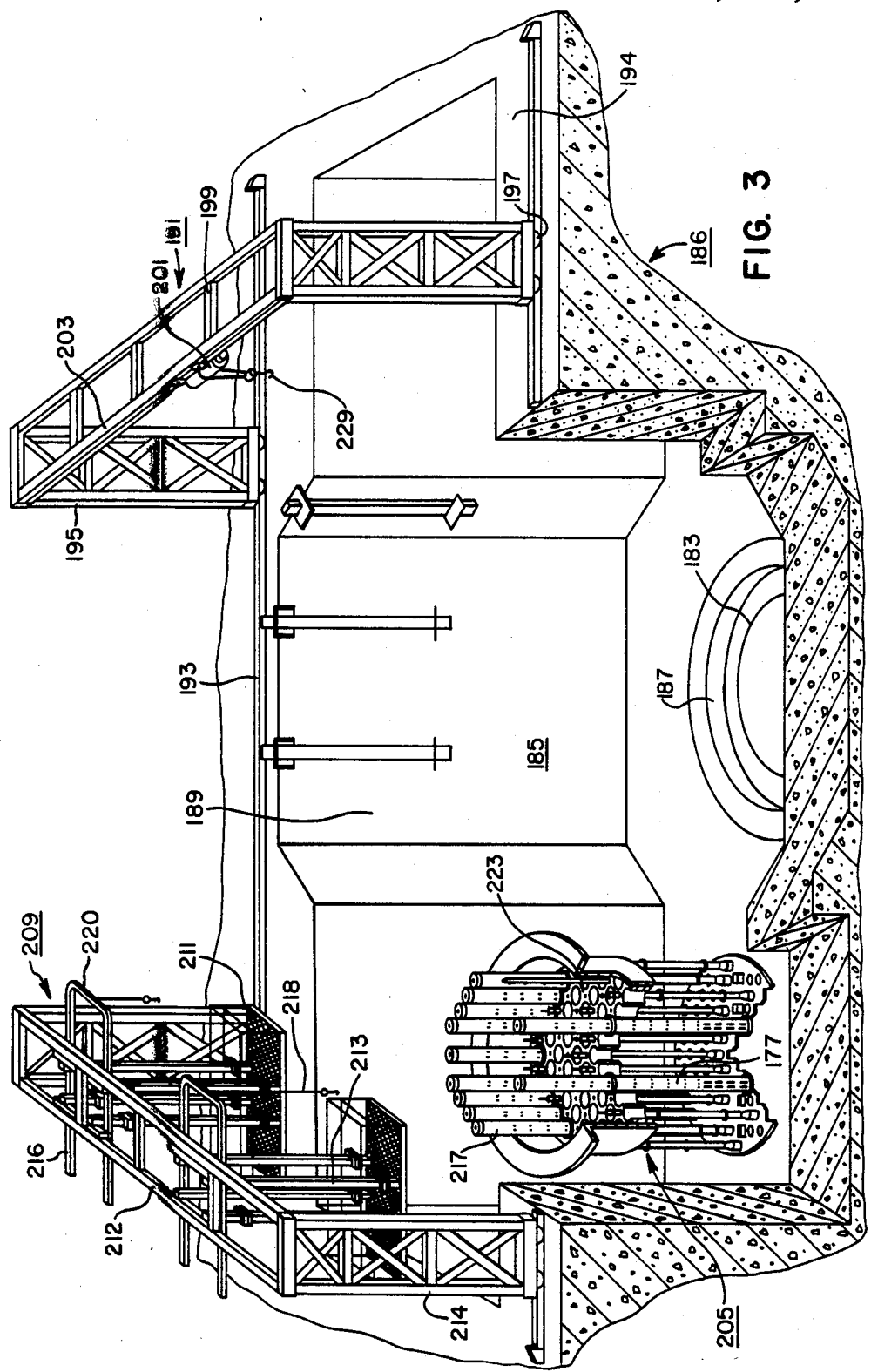

REPLACEMENT OF SPLIT-PIN ASSEMBLIES IN GUIDE TUBES

REFERENCE TO RELATED APPLICATIONS

Application Ser. No. 617,857, filed concurrently herewith to Raymond F. Calfo, George F. Dailey and Raymond P. Castner for REPLACEMENT OF SPLIT PINS IN GUIDE TUBES assigned to Westinghouse Electric Corporation is incorporated in this application by reference.

Application Ser. No. 576,645 filed Feb. 3, 1984 to John T. Land, Ronald J. Hopkins and Jose M. Martinez for REPLACEMENT OF SUPPORT PINS FOR GUIDE TUBES IN OPERATING PLANTS and assigned to Westinghouse Electric Corporation (herein Land).

BACKGROUND OF THE INVENTION

This invention relates to nuclear reactors and it has particular relationship to the repair of guide tubes of a nuclear reactor. The guide tube is part of the upper internals of a nuclear reactor. A guide tube is mounted above a fuel assembly of the core of the reactor and it serves to guide the control-rod cluster of an assembly and the control-rod drive as the cluster is displaced upwardly or downwardly with reference to the core. Each guide tube is positioned, and held transversely by, the upper core plate of the reactor. Typically, a pair of bifurcated or split pins are suspended, spaced 180° from the lower end of the guide tube. Each split pin is held by a nut which is locked to a counterbore in the flange of the guide tube. The tines or leaves of the pins resiliently engage walls of corresponding holes in the upper core plate of the reactor positioning the guide tube to receive the control-rod cluster as it is moved upwardly or downwardly. The coolant of the reactor which bathes the pins is corrosive with respect to the pin material. It has been found that as a result of stress-corrosion cracking of the old split-pins which are currently in some reactors, the hold-down nut for the pin may be released. Under the action of the coolant, the released nut may migrate through the upper internals into the piping and steam generator of the nuclear-reactor power plant and may damage the piping or the generator. In operation of a reactor, repair of a steam generator was required following discovery that an old nut had migrated into the channel head of the steam generator.

The presence of cracks in split pins which may lead to failure can be determined by ultrasonic testing. Ultrasonic testing on the reactor at Point Beech, Wis. has revealed indications of cracks in about 90% of the split pins. Based on this relevation, it appears that discovery of a crack in a split pin would demand that corrective action be taken not only with respect to the guide tube involved but with respect to all guide tubes, typically about 60 or 61, in the reactor. Corrective action is taken as to all guide tubes of a reactor if a nut is discovered in the channel head of a steam generator or in other parts of the reactor power plant. There are also reactors as to which it is anticipated, for other reasons than by ultrasonic testing or migration of a nut into the channel head, that the split-pins may fail. Corrective action is taken as to all guide tubes of such suspected reactors.

In accordance with the teachings of the prior art, it has been the practice, implemented in July and August of 1982, to replace the guide-tube assembly as a whole. This practice has the disadvantage that the cost and time of replacement is high particularly in light of the fact that the guide tubes are composed of stainless steel and the pins of Inconel alloy and the cost of, and time consumed by, fabricating a guide tube is high. A guide tube may cost as of the date of this application as much as $80,000.00 and the time of fabrication of a whole assembly may be a year. A more important drawback is that the guide tube assemblies are highly radioactive and disposal of so massive, radioactive objects presents serious problems.

Another prior art practice which was developed and used in Japan in late 1978 and later, in early 1979, in France, is to replace only the split pins in a "hot" cell environment. This practice was further developed in France in late 1982 and early 1983. The old split pin is welded to the old nut. The "hot" cell practice has the advantage that in a "hot" cell the new split pin can be welded to the new nut. This practice has the drawback that it demands high personnel radiation exposure for long time intervals and is necessarily highly labor intensive and highly costly. The radiation levels may be as high as 1000 REM per hour. An expedient which has been adopted is to decontaminate the whole guide tube before replacing the split pins but this is costly and the decontamination leaves substantial residual radiation.

It is an object of this invention to overcome the disadvantages and drawbacks of the prior art and to provide apparatus and a method for correcting for the failure or potential failure of the split pins of the guide tubes of a nuclear reactor.

SUMMARY OF THE INVENTION

In accordance with this invention the old split pins which are subject to stress-corrosion cracking and their old nuts are replaced by new slit pins not subject to stress-corrosion cracking and new hold-down nuts in a robotic work station under a pool of, typically borated, water. The pool protects personnel from radioactivity. Each split pin and the nut which holds it is sometimes referred to, in this application, as a "split-pin assembly", the old replaced pins and old nuts being referred to as an "old split-pin assembly" and the new pins and nuts being referred to as "new split-pin assembly". The robotic work station includes a plurality of robotic tools which are remotely actuable from a robotic control center outside of the pool. The replacement of the old split-pin assemblies by the new split-pin assemblies is completely performed by these robotic tools in the pool under water.

The guide tube is composed of an upper section, sometimes referred to as a thermal sleeve or upper guide tube, and a lower section referred to as a lower guide tube (LGT). It is the LGT which is processed in the replacement of the old split-pin assemblies in the practice of this invention.

In the old split-pin assemblies the nut and split pin are secured together by a dowel pin which passes transversely through, and is welded to, the split pin and nut. Welding in borated water presents serious problems. These problems are avoided by securing the pin and nut together by a locking cap which extends from the nut and is crimped into grooves in the pin.

Specifically, the tools for carrying out the complete replacement operation include a positioning tool which is referred to as a clamp-and-index tool. This tool positions the lower guide tube precisely for processing and includes means for rotating or indexing the lower guide tube so that both split pins may be processed by one set of tools and also so that at the start of each successive operation the lower guide tube is properly positioned to be processed by the appropriate tool in the order of succession. In addition, there are in the work station an old-split-pin-assembly-removal tool, a pick-and-put tool, a brush tool, a pin-insertion/torque tool, a crimper tool and a new-nut hopper. The old-split-pin-assembly removal tool fragments the old assembly by metal disintegration machining and is referred to as an MDM. Typically, there is one fragment which includes what is left of the old nut and the part of the old pin to which it is threaded and a second fragment which is the residual part of the old pin. The first fragment is herein called the nut fragment. The pick-and-put tool removes the nut fragment and removes new nuts from the hopper and places each new nut in position to be threaded onto its associated new pin, the brush tool cleans the guide tube in the region where the old split-pin assembly was fragmented and removed. The pin-insertion/torque tool inserts the new pin in the guide tube and torques the new nut to it. The crimper tool crimps the locking cap onto the new pin.

BRIEF DESCRIPTION OF THE DRAWINGS

For a better understanding of this invention, both as to its organization and as to its method of operation, together with additional objects and advantages thereof, reference is made to the following description, taken in conjunction with the accompanying drawings, in which:

FIG. 1 is a view in longitudinal section, with the split pin shown partly in elevation, of a new split-pin assembly which replaces an old split-pin assembly in the practice of this invention;

FIG. 2 is a plan view enlarged of the new assembly taken in the direction II—II of FIG. 1;

FIG. 3 is a view in isometric, generally diagrammatic, showing the apparatus for transferring the upper guide tube section and LGT for processing;

DETAILED DESCRIPTION OF THE INVENTION

Figure 5:
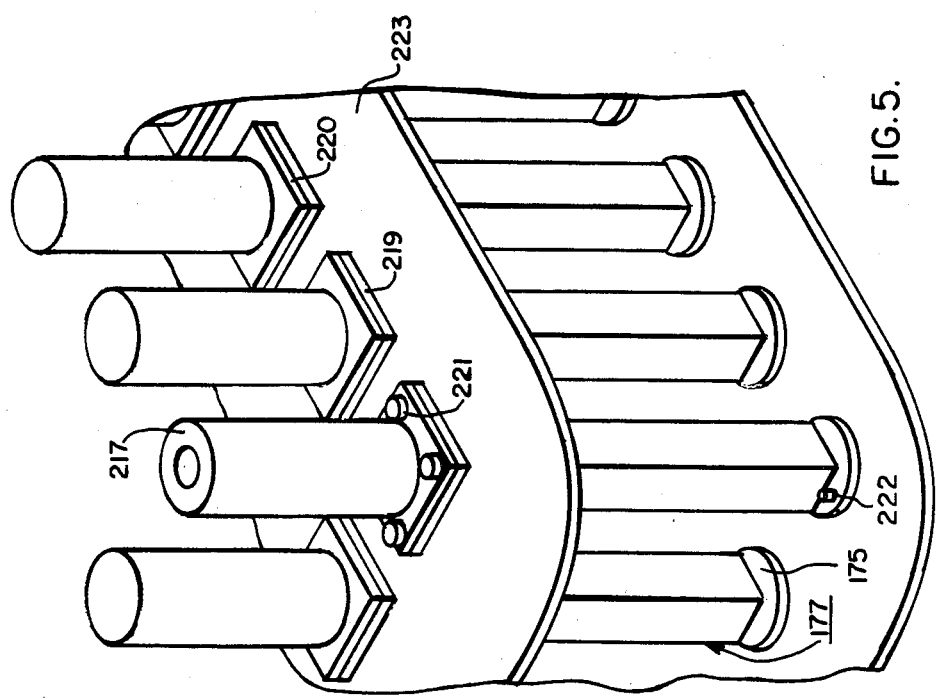
FIG. 5 is a fragmental view in isometric, generally diagrammatic, showing enlarged the portion of the upper internals of a nuclear reactor including the guide tubes.

The new split-pin assembly 100 shown in FIGS. 1 and 2 includes a split pin 127(b) and a new nut 128. The split pin includes a shank 153 having an intermediate threaded section 155. An unthreaded stem 157 extends from the top of the threaded section 155. The stem 157 has opposite flutes 158 spaced 90°. A flange 159 extends from the bottom of the shank. The shank terminates in a parabolic fillet 161 at the flange. Tines or leaves 162 extend from the flange 159. The new nut 128 has a central threaded portion which is threaded onto the pin. The threaded portion terminates in a collar 160 at one end and in a skirt 161 at the opposite end. Below the collar 160 the nut has a splines 164. A locking cap 167 is secured in diametrically opposite holes in the collar 160 and into one pair of opposite flutes 158 in the stem 157. The locking cap is secured so tightly that it precludes relative rotation of the nut and split pin under the conditions existing in the reactor. The assembly 100 is secured in upper and lower counterbores 171 and 173 of the lower flange 175 of the lower guide tube 177 (FIGS. 3, 5). The tines 162 resiliently engage the walls of a hole 179 in the upper core plate 181 of the reactor.

As shown in FIG. 3 the reactor 183 (only lower part of pressure vessel shown) is in a pit 187 in the base of a chamber or cavity 185 of the containment 186 of a nuclear reactor plant. The head (not shown) of the reactor 183 has been removed. The chamber 187 contains a pool 189 of borated water. A traveling crane 191 is moveable along tracks 193 on the deck 194 of the containment. The crane 191 includes opposite columns 195 having at their base wheels 197 which ride on the tracks 193. A bridge 199 is supported by the columns 195. The bridge 199 carries a carriage 201 which is moveable along tracks or guides 203 on the bridge 199 in a direction perpendicular to the tracks 193. The crane is provided with drives (not shown) for the movement along the tracks 193 and 203 and with a platform (not shown) for personnel controlling its movement.

After the head (not shown) of the reactor 183 is removed, its upper internals 205 are removed by the polar crane (not shown) of the containment 186 to a storage stand of the chamber 185, as shown in FIG. 3, where the upper internals may be appropriately handled. The polar crane also serves to mount, on the operating deck 194 of the containment 186, a gantry 209 with working platforms 211. The gantry 209 remains in fixed position on the deck 194. The gantry 209 has a cross member 212 supported by columns 214. The working platforms 211 are suspended by columns 213 from the cross member 212. U-shaped brackets 216 are mounted on the cross member 212 movable transversely to the cross member. Each U-bracket 216 carries a hoist 218 centrally of the web 220 of the U. The hoists 218 and the U-brackets 216 are driven by drives (not shown) whose control is accessible to the personnel on the working platforms 211.

Each guide tube includes in addition to the LGT 177 a thermal sleeve or upper guide tube 217. In addition to its lower flange 175, the LGT includes an upper flange 219 (FIG. 5). FIG. 5 and the other similar views show an old split-pin assembly 222 in the lower flange 175. The upper guide tube 217 also has a lower flange 220. The upper and lower guide tubes 217 and 177 are connected coaxially by bolts 221 which pass through clearance holes in the flanges 219 and 220 and are threaded into the upper support plate 223.

Figure 4:
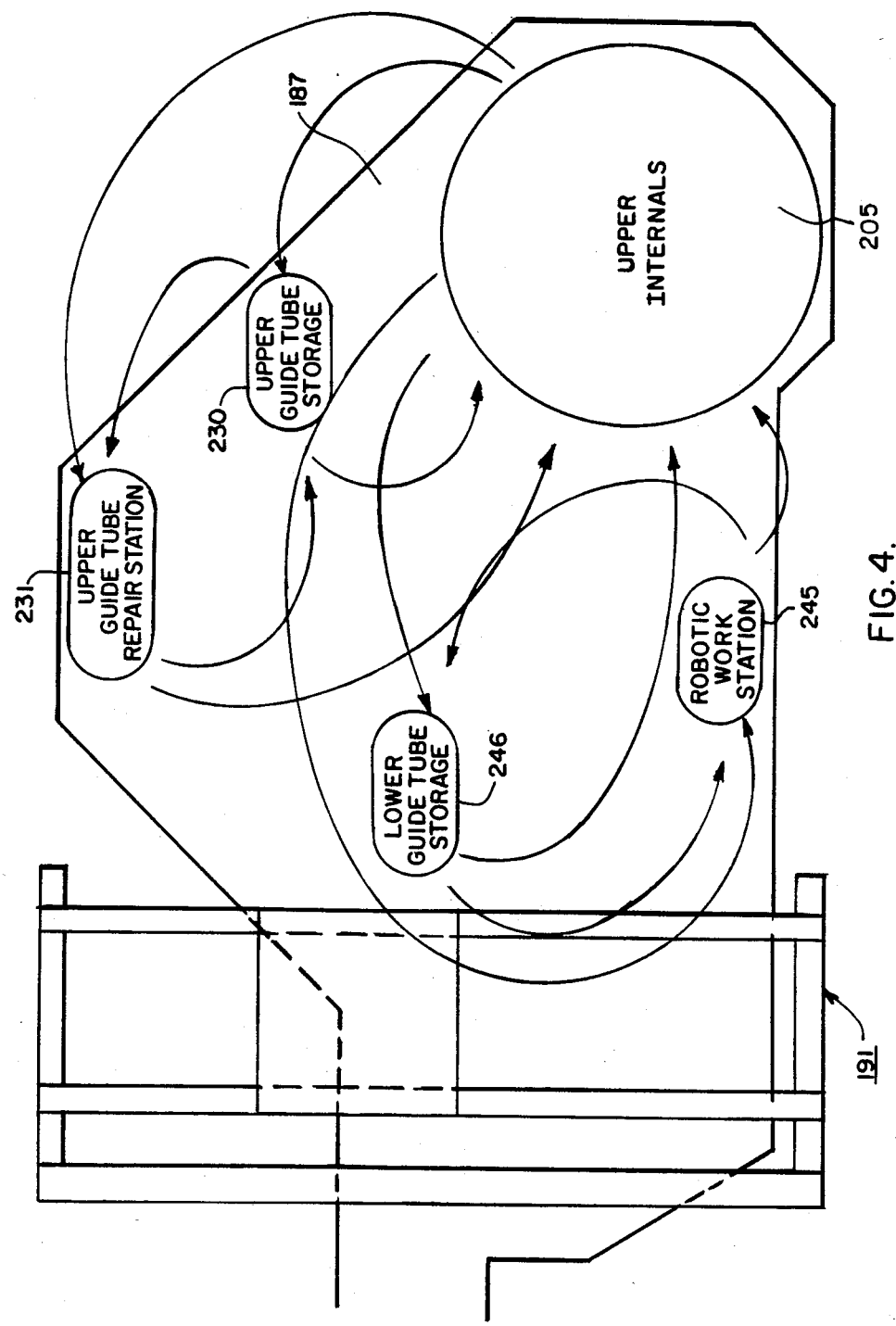
FIG. 4 is a diagram showing the different transfer paths of the upper and lower guide tubes during a replacement operation.

In the practice of this invention the upper guide tube 217 is separated from the LGT 177 and both are moved to storage 230 and 246, respectively, or to processing stations 231 and 245 as shown by the arrows in FIG. 4.

Figure 6:
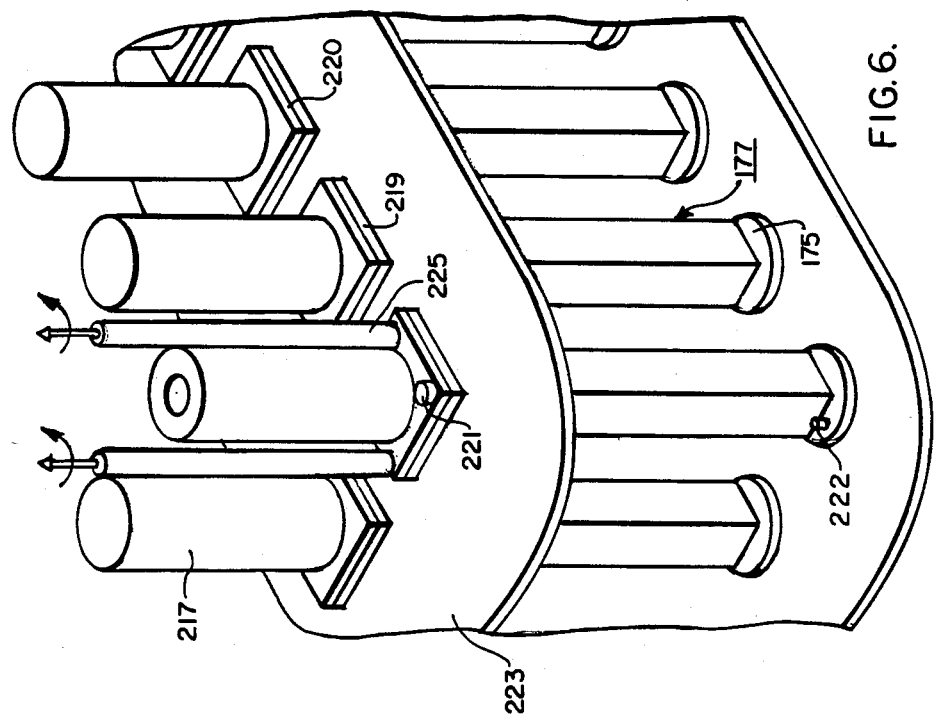
FIGS. 6, 7, 8, and 9 are fragmental views in isometric similar to FIG. 5 showing successive steps in the disassembly of a guide tube unit into lower and upper guide tubes for transfer.
Figure 7:
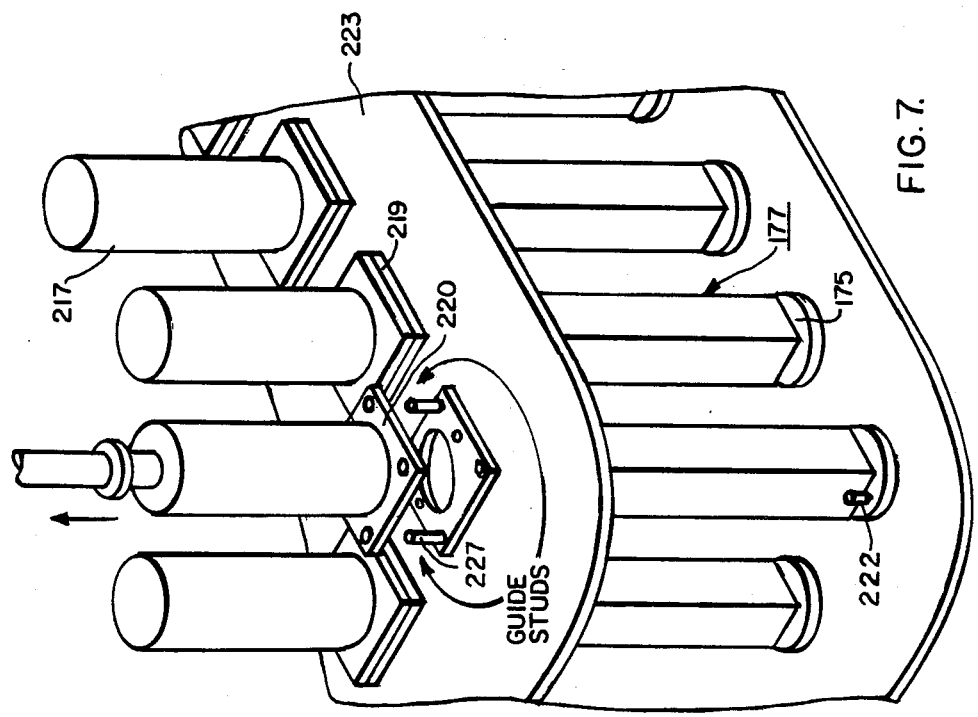
Figure 10:
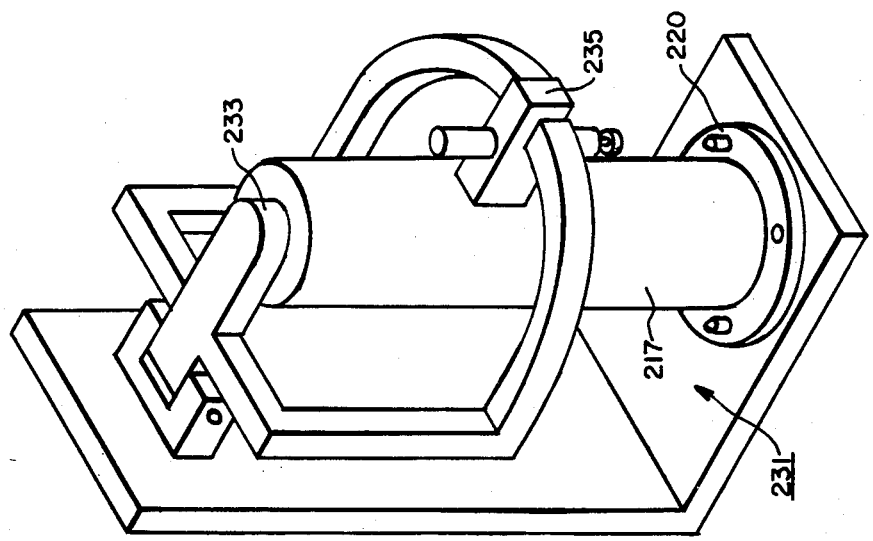
FIG. 10 is a view in isometric, generally diagrammatic, showing enlarged the mounting of an upper guide tube in a repair station.
Figure 9:
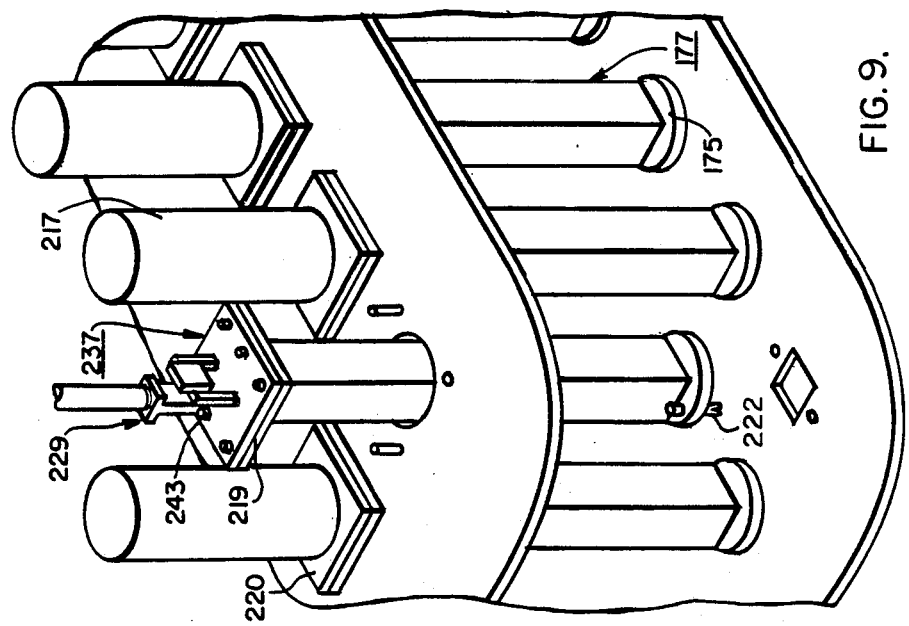

With the upper internals 205 submerged below the pool 189 at the storage stand, the bolts or cap screws 221 are unthreaded by long-handled tools 225 (FIG. 6) exposing the bolt holes in the flanges 219 and 220. Guidance studs 227 (FIG. 7) are inserted in diagonal bolt holes in the flanges 219 and 220 and threaded into the upper support plate 223. The upper guide tube 217 is then raised by the hoist 218 and transferred to the hook 229 (FIG. 3) of the traveling crane 191, which is moved to a position near the upper internals 205, where the transfer may be effected. The traveling crane 191 transfers the upper guide tube 217 to storage 230 or to an upper-guide-tube work station 231 (FIG. 10) where the upper guide tube may be repaired if necessary. The work station 231 includes a clamp 233 (FIG. 10) for securing the upper guide tube and a tool fixture 235 for making repairs. Where repair is not necessary, the upper guide tube 217 is placed in a storage 200.

Figure 8:
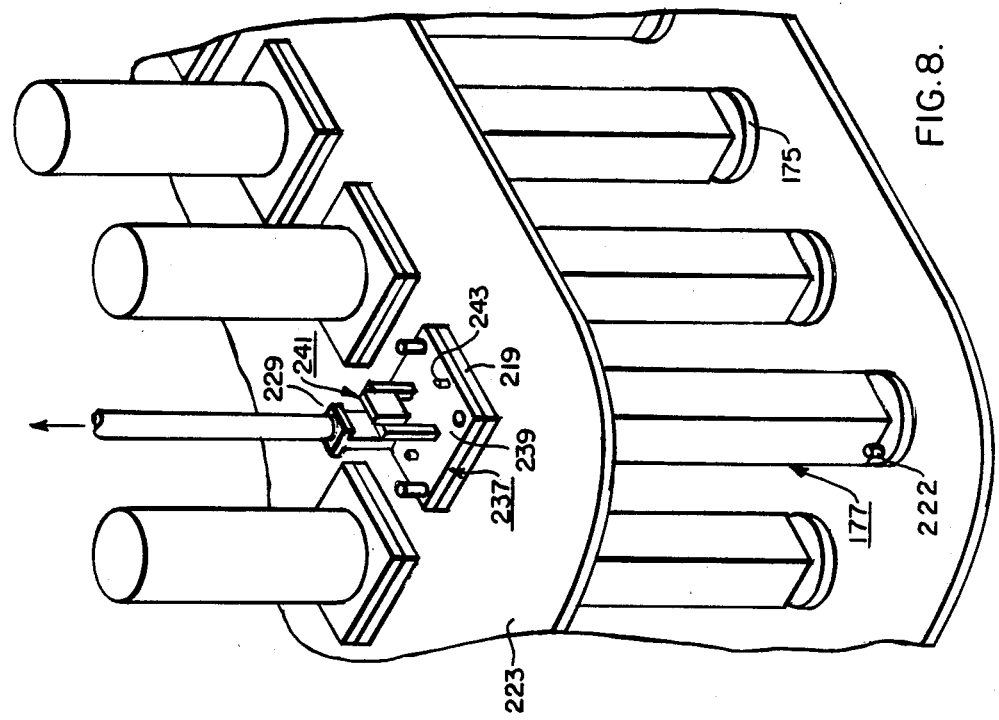
Figure 11:
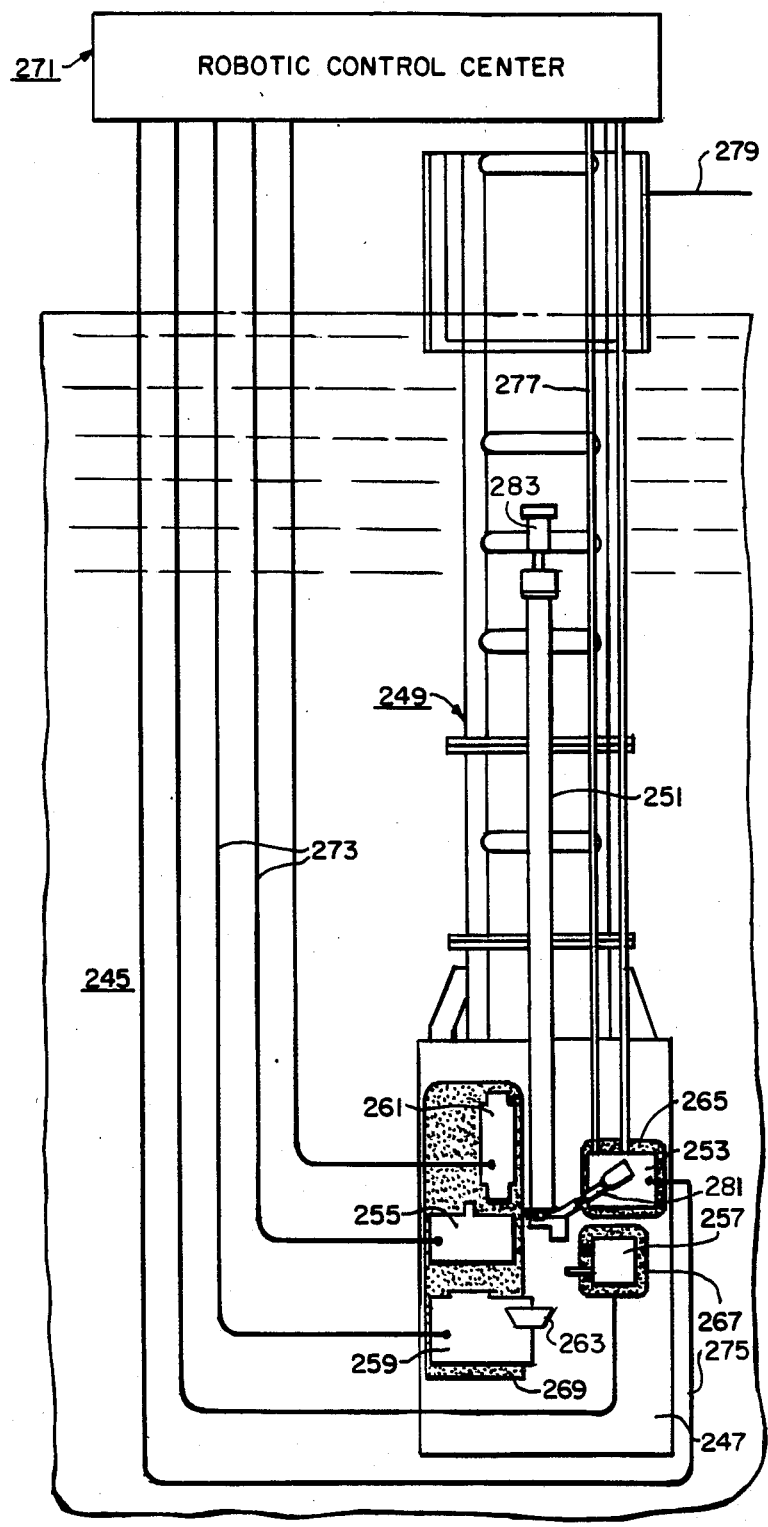
FIG. 11 is a diagrammatic view showing the robotic work station for replacing the old split-pin assemblies.

A bail 237 (FIG. 8) is now secured to the flange 219 of the LGT. The bail 237 includes a rectangular plate 239 on which is mounted a lifting fixture 241 of generally C cross-section. The flange 219 has threaded holes in which bolts 243 are engaged to secure the bail to the flange 219. The hook 229 is attached to the bail 237 and the LGT is raised by the traveling crane 191 and moved into the LGT robotic work station 245 (FIG. 11) or to storage 246 (FIG. 4).

The work station 245 (FIG. 11) includes a strong-back 247 suspended on a frame 249 of pipes extending from a platform above the pool 189. The strong-back supports a clamp-and-index tool 251, a MDM tool 253, a pick-and-put tool 255, a brush tool 257, a pin-insertion/torque tool 259, a crimping tool 261 and a hopper 263 for new nuts 128. The MDM 253 and the brush tool 257 are mounted on cluster plates 265 and 267 and the pick-and-put tool 255, the pin insertion/torque tool 259 and the crimper tool 261, and the hopper are mounted on a cluster plate 269. The cluster plates are suspended from the strong back 247 by dove-tails (not shown). The clamp-and-index tool 251 is directly suspended on a dove-tail (not shown) from the strong back. The tools are operated hydraulically remotely from a robotic control center 271 external to the pool 189. Hoses 273 and electrical conductors 275 extend from the tools to the robotic control center. The MDM is moveable on tracks 277 from the work station 245 to the platform 279 external to the pool so that its electrodes 281 may be replaced.

When the LGT 277 is transported to the work station 245, it is positioned on the clamp-and-index tool 251 for processing. The LGT 177 is suspended by its upper flange 219 from an upper level on the clamp-and-index tool 251 with its lower flange 175 positioned so that the old split-pin assemblies 218 can be replaced by operation of the other tools. The upper level of the clamp-and-index tool 251 is provided with pins (not shown) which engage diagonal bolt holes in the upper flange 219 to suspend the LGT. The clamp-and-index tool is provided with a hydraulic cylinder 283 for rotating or indexing the LGT, typically through 180°, so that the LGT is properly positioned to be processed by the other tools and also so that both split-pin assemblies 218 may be replaced by a single set of robotic tools. There is also a lift cylinder for raising the LGT from the pins so that it can be rotated. The lift cylinder is connected to the bail 237. After the LGT is positioned in the clamp-and-index tool, the hoist 229 is uncoupled and removed.

The MDM 253 disintegrates the old split-pin assemblies 218 into readily removable fragments. The predominantly nut and predominantly pin fragments are removed, respectively, by the pick-and-put tool and by an expeller on the clamp-and-index tool. The counterbores 171 and 173 (FIG. 1) are cleaned by the brush tool 257. The new nut 128 is then positioned in the upper counterbore 171 by the pick-and-put tool 255 and the new pin 127b is positioned by the pin-insertion/torque tool 259 with its threaded section 155 extending through the lower counterbore 173 so that the upper end of the threaded section is in engagement with the lower end of the thread in the new nut 128. The new nut is then threaded onto the new pin by the pin-insertion/torque tool 159. The nut is held down during the threading so that the pin 127b is drawn into the lower counterbore 173. With the installation of the new split-pin assembly 100 completed, the LGT may be removed to storage 246 for future installation in the upper internals 205 or it may be directly installed.

The complete operation including the separation of the upper guide tube 217 from the LGT 177 and the transport back and forth of the upper guide tube and the LGT and reinstallation of both guide tubes is performed under water without exposure of personnel to the hazards of radioactivity.

The setting up of the tools in the robotic work station 245, and the other activities involved in the preparation of the tools for a split-pin-assembly replacement operation, currently consumes about two weeks. Once the tools are in proper operation, an old split-pin assembly can be replaced in an LGT 177 in about two hours. There are about 61 guide tubes in a reactor; these LGT's can be replaced in about a week. Dismantling of the work station consumes about a week. A complete replacement operation for a reactor from the time that it is taken off-line to the time that it is placed on-line completely repaired consumes about four weeks. The replacement of a complete new guide-tube assembly in accordance with the teaching of the prior art has been found to consume 42 days. This does not include the time taken for fabricating the assembly which may consume as long as a year. The disposal of the old radioactive guide tube assembly presents a problem which has not been solved in the United States. The Japanese and French processes are also time consuming.

While preferred embodiments and practice of this invention has been disclosed herein, many modifications thereof are feasible. This invention is not to be restricted except insofar as is necessitated by the spirit of the prior art.

We claim:

1. Apparatus for replacing the old split-pin assemblies of a guide tube of a nuclear reactor with new split-pin assemblies, the said guide tube being composed of a lower guide tube and an upper guide tube connected coextensively with said upper guide tube, the said old split-pin assemblies being mounted in said lower guide tube, the said reactor being submerged in a pool of water in a chamber in the containment within which the reactor normally operates, the said guide tube and the said old split-pin assemblies being highly radioactive; the said apparatus including remotely actuable means for separating said upper guide tube from said lower guide tube and a work station submerged in said pool of water and mounted on the wall of said pool, the said work station including:
   (a) remotely-actuable means for positioning a lower guide tube to be processed,
   (b) remotely-actuable means for removing an old split-pin assembly from said lower guide tube so positioned, and
   (c) remotely-actuable means for installing a new split-pin assembly in said lower guide tube so positioned; said apparatus also including transport means over said pool for engaging and transporting said lower guide tube to said positioning means in said work station after said lower guide tube has been separated from said upper guide tube, means, operable responsive to commands externally of said pool and connected to said transport means, for enabling said transport means to engage and transport said lower guide tube, and means, also operable responsive to commands externally of said pool and connected to said positioning means, said removing means, and said installing means, for actuating said positioning means to position said transported lower guide tube for processing, thereafter actuating said removing means to remove said old split-pin assembly from said transported lower guide tube, and thereafter actuating said installing means to install a new split-pin assembly in said lower guide tube.

2. The method of replacing the old split-pin assemblies of a guide tube of a nuclear reactor by new split-pin assemblies, said guide tube being composed of an upper guide tube and a lower guide tube connected coextensively to said upper guide tube, said old split-pin assembly being mounted in said lower guide tube; said new split-pin assemblies including a new nut and a new split pin, said nut having a locking cap, said guide tube and said old split-pin assemblies being highly radioactive, said method being practiced with apparatus including a work station under a pool of water for processing a lower guide tube to replace an old split-pin assembly by a new split-pin assembly and transport means for engaging and transporting said lower guide tube to said work station; the said method including the following steps carried out by operation commanded externally of said pool:

(a) separating said lower guide tube from said upper guide tube, (b) enabling said transport means to transport said lower guide tube for processing to said work station, and (c) processing said transported lower guide tube as follows:

(i) precisely positioning said transported lower guide tube for replacement of old split-pin assemblies by new split-pin assemblies, (ii) separating an old split-pin assembly of said positioned lower guide tube into readily removable fragments, (iii) removing and disposing of said fragments, (iv) cleaning the region of said positioned lower guide tube where the old split-pin was removed, (v) inserting a new nut in said positioned lower guide tube in position to engage and secure a new split pin, (vi) inserting a new split pin in said positioned lower guide tube in position to be secured by said inserted nut, (vii) securing said positioned new nut to said positioned new split pin, and (viii) crimping said locking cap on said pin.

3. The method of replacing the old split-pin assemblies of the lower guide tube of a nuclear reactor by new split-pin assemblies, said lower guide tube and said old split-pin assemblies being highly radioactive, said lower guide tube being contained in the upper internals of said reactor secured to an associated upper guide tube by bolts, the said method being practiced with a work station under a pool of water, said work station including robotic tool means for carrying out the said replacement, the said method including disconnecting the bolts securing said lower guide tube to its corresponding upper guide tube thereby exposing the bolt holes in the lower guide tubes, removing said corresponding upper guide tube, securing a bail to said lower guide tube, engaging said bail and transporting said lower guide tube from said upper internals to said work station, with said robotic tool means replacing the old split-pin assemblies in said transferred lower guide tube by new split-pin assemblies, and thereafter transporting said lower guide tube to said upper internals and reinstalling said lower guide tube in said upper internals.

4. Apparatus for replacing the old split-pin assemblies of a guide tube of a nuclear reactor with new split-pin assemblies, said guide tube being composed of an upper guide tube and a lower guide tube connected coextensively to said upper guide tube; the said old split-pin assembly being mounted in said lower guide tube, each new split-pin assembly including a new split pin and a new nut, said new nut having a locking cap to be crimped to said new split pin; the said apparatus including remotely actuable means for separating said upper guide tube from said lower guide tube and a work station submerged in a pool of water, the said work station including remotely-actuable means each:

(a) for positioning a lower guide tube to be processed;

(b) for removing an old split-pin assembly from a lower guide tube so positioned, and (c) for installing a new split-pin assembly in said lower guide tube so positioned;

the said positioning, removing and installing means including:

(d) lower-guide-tube positioning tool means;

(e) tool means for separating the said old split-pin assembly mounted in said lower guide tube into readily-removable fragments;

(f) tool means for removing said fragments;

(g) tool means for cleaning said lower guide tube in the region where said fragments have been removed;

(h) a hopper containing new nuts;

(i) pick-and-put tool means for removing a new nut from said hopper and positioning said new nut in new-split-pin securing position in said positioned lower guide tube;

(j) pin inserter/torque-tool means for positioning a new split pin in said lower guide tube in position to be secured by said positioned new nut and for securing said positioned new nut to said positioned new split pin; and (k) crimping-tool means for crimping a locking cap to said positioned new split pin;

the said apparatus also including:

(l) transport means for removing a lower guide tube from said reactor after said upper guide tube has been separated therefrom and for transporting said removed lower guide tube to said positioning means in said work station;

(m) means, operable responsive to command externally of said pool and connected to said transport means, for enabling said transporting; and (n) means, also opeable responsive to command externally of said pool and connected to the above-listed components (d) through (k) of said remotely actuable means, for actuating said positioning means to position said transported lower guide tube for processing, thereafter actuating said removing means to remove said old split-pin assembly from said transported lower guide tube, and thereafter actuating said installing means to install a new split-pin assembly.

5. The method of replacing an old split-pin assembly in a guide tube of a nuclear reactor with a new split-pin assembly, said guide tube being composed of an upper guide tube and a lower guide tube connected coextensively to said upper guide tube; the said method being practiced with tools submerged in water in a work station; the said method comprising separating said lower guide tube from said upper guide tube, after said lower guide tube has been separated from said upper guide tube, transporting said lower guide tube to said work station in position to be processed for replacement of said old split-pin assembly by said new split-pin assembly, and actuating said tools cooperatively with said lower guide tube to replace said old split-in assembly by said new split-pin assembly.

6. The method of claim 5 wherein the tools are in fixed position in the work station and the lower guide tube is moved with reference of the tools for processing by selected tools.

* * * * *